United States Patent [19]

Hunsaker et al.

[11] Patent Number: 5,758,406
[45] Date of Patent: Jun. 2, 1998

[54] METHOD FOR ASSEMBLING AND ELECTRICAL TESTING OF A MAGNETIC HEAD

[75] Inventors: Michael D. Hunsaker, Ramona; Barry W. Darr, Oceanside, both of Calif.

[73] Assignee: Read-Rite Corporation, Milpitas, Calif.

[21] Appl. No.: 796,870

[22] Filed: Feb. 7, 1997

[51] Int. Cl.$^6$ .................................................. G11B 5/42
[52] U.S. Cl. ................................. 29/603.06; 29/603.09; 360/103; 360/104
[58] Field of Search .................... 29/603.06, 603.04, 29/603.05, 603.09; 360/103, 104

[56] References Cited

U.S. PATENT DOCUMENTS

| | | | |
|---|---|---|---|
| 4,520,555 | 6/1985 | Gyi et al. | 29/603.06 |
| 5,410,402 | 4/1995 | Li et al. | 356/243 |
| 5,453,831 | 9/1995 | Li et al. | 356/243 |
| 5,682,669 | 11/1997 | Harrison et al. | 29/603.06 |

*Primary Examiner*—Carl E. Hall
*Attorney, Agent, or Firm*—Nathan N. Kallman

[57] ABSTRACT

A test fixture for assembling and electrical testing of a magnetic head includes a fixed baseplate, a cage, and an X-Y positioner that is adjustably mounted on the baseplate. The cage is formed of a flat, thin, elongated arm and is secured at its rear end to the X-Y positioner. The forward end of the cage extends into a notched section that surrounds part of the slider. A stationary mounting block supports and retains the suspension in a fixed position relative to the slider. In another embodiment, the rear end of the cage is secured to the stationary mounting block and the X-Y positioner supports the suspension. The testing method includes pre-wiring a slider and separately mounting the wired slider and suspension into the test fixture. Adhesive is applied on the slider or suspension for establishing a temporary bond between the slider and the suspension. The suspension is then loaded onto and temporarily positioned relative to the slider. A magnetic disk is rotated over the slider, and the generated dynamic performance is analyzed. If the dynamic performance is not adequate, then the position of the slider is adjusted relative to the suspension.

12 Claims, 2 Drawing Sheets

METHOD FOR ASSEMBLING AND ELECTRICAL TESTING OF A MAGNETIC HEAD

FIELD OF THE INVENTION

This invention relates to magnetic heads and in particular to improved methods and test fixtures for assembling and electrically testing a magnetic head.

DESCRIPTION OF THE PRIOR ART

Magnetic read/write heads are becoming increasingly more difficult to manufacture due to the tighter performance requirements and design tolerances set by the industry. During conventional head manufacturing, an air bearing slider is joined to a stainless steel suspension. When the head is completed, it is tested. However, once bonded, the components cannot be readily disassembled without damage.

In operation, the slider is supported by an air bearing as the magnetic medium or disk is rotated. The air bearing is at most a few microinches thick, and is determined by the geometry of the slider bearing surfaces and the "gram load". As used herein, "gram load" means the load applied by the suspension against the slider forcing it toward the magnetic medium, as the slider flies above the magnetic medium. In proximity heads, the sensor portion of the slider may lightly contact the surface of the magnetic disk. To reduce the effects of the suspension tolerances on the slider flying attitude, the slider is secured to a gimbal mount comprised of a thin metal leaf spring pivoting over a raised dimple on the suspension. The dimple is also referred to as the "load point".

The testing of a magnetic head is performed by mounting it over a test magnetic disk, and by writing and reading data on the disk. Some of the critical operational and testing parameters are the attitude of the slider and the transducer deposited thereon, relative to the disk, and the air bearing thickness. Ideally, the suspension is straight and the suspension load point is located directly over the center of the pressure distribution of the air bearing. Head performance is improved by minimizing the flying height of the slider and its transducer. If the air bearing is too thin or produces too high a contact force in proximity heads, the head will contact and damage the magnetic disk because of other tolerances in the disk drive, such as disk runout and spindle bearing tolerances.

After bonding and testing, the transducer wiring is routed along the suspension, and is typically threaded through an insulating tubing or "sleeving". The transducer wiring is retained in place by means of crimp tabs that are bent against the wiring. The bending of the crimp tabs frequently distorts the suspension and adversely affects the suspension attitude and head performance. As a result, some of the existing techniques for bonding and testing of the transducer in a static state are not completely accurate.

SUMMARY OF THE INVENTION

An object of this invention is to provide an improved process for optimally positioning a slider relative to a magnetic head suspension, and for testing magnetic head performance.

It is another object of this invention to minimize the need for electrical testing after the completion of the magnetic head, by determining at the time of bonding whether the slider is properly connected, and the way in which the manufacturing tolerances affect the final flying performance of the head. This is accomplished by actually flying the head and analyzing its dynamic performance before the final assembly of the head.

It is still another object of this invention to automate and individualize the bonding process of the slider on the suspension.

According to this invention, a test fixture for assembling and electrically testing a magnetic head includes a fixed base plate, a cage, and an X-Y positioner that is adjustably mounted on the base plate. The cage is formed of a flat, thin, elongated arm and is secured at its rear end to the X-Y positioner. The forward end of the cage extends into a notched section that surrounds part of the slider. A stationary mounting block supports and retains the suspension in a fixed position relative to the slider. In another embodiment, the rear end of the cage is secured to the stationary mounting block and the X-Y positioner supports the suspension.

The testing method includes pre-wiring a slider and separately mounting the wired slider and a suspension into the test fixture. Adhesive is applied on either the slider or the suspension for establishing a temporary bond between the slider and the suspension. The suspension is then loaded onto and temporarily positioned relative to the slider. A magnetic disk is spun at a flying attitude over the slider, and the generated dynamic performance is analyzed. If the dynamic performance is not adequate, then the position of the slider is adjusted relative to the suspension. When performance is adequate, the adhesive is then fully cured.

BRIEF DESCRIPTION OF THE DRAWING

The invention will be described in greater detail with reference to the drawing in which.

Similar numerals refer to similar elements in the drawing. It should be understood that the dimensions of the different components in the Figures are not necessarily in exact proportion.

DETAILED DESCRIPTION OF THE INVENTION

Figure 1:
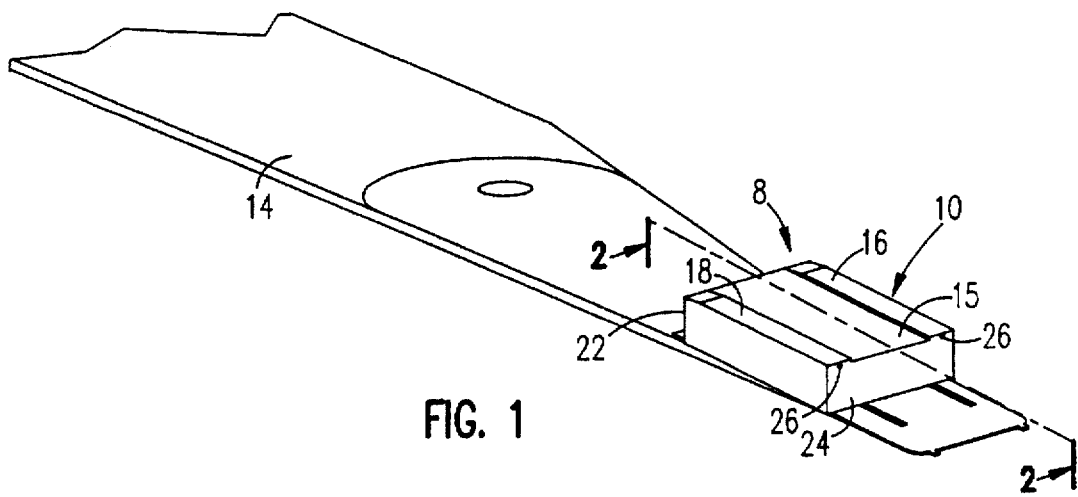
FIG. 1 is a partial isometric view of a magnetic head shown ready for testing according to the present invention.
Figure 2:
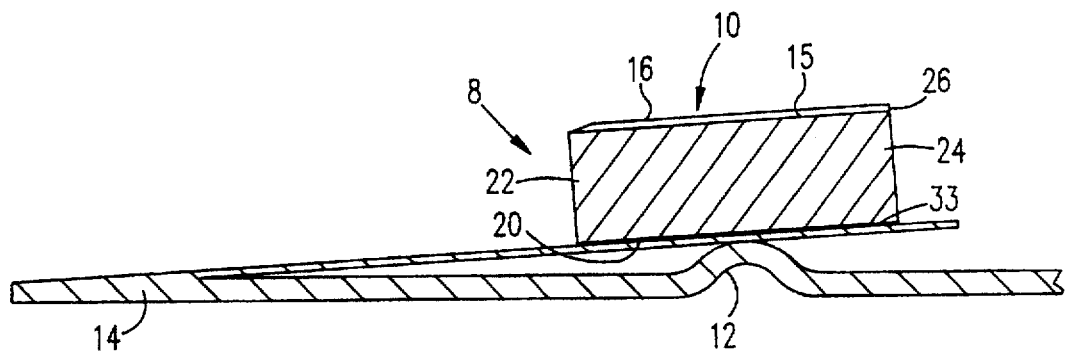
FIG. 2 is an enlarged sectional view of the magnetic head of FIG. 1 taken along line 2—2 and showing the quick-tack bonding of the slider to the suspension.

FIGS. 1 and 2 illustrate a magnetic head 8 comprised of an air bearing slider 10 positioned over a dimple 12 stamped in the end portion of a suspension 14 (partially shown). The slider 10 may be a conventional slider formed ceramic material and has an air bearing surface (ABS) 15 that includes two side rails 16, 18, a surface 20 opposite and parallel to the air bearing surface 15, a leading edge 22, and a trailing edge 24. In this embodiment, either one or two thin film transducers 26 are formed at the trailing ends of rails 16, 18 respectively, even though only one transducer 26 will be activated as a read/write element.

Figure 3:
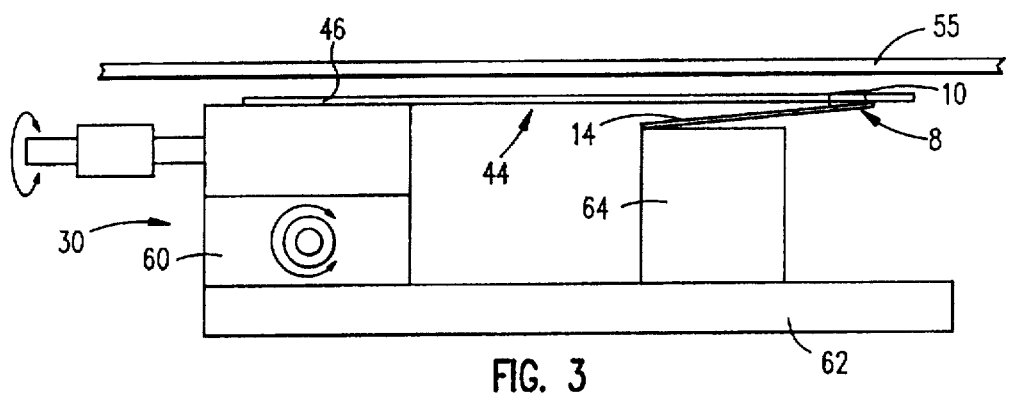
FIG. 3 is a schematic view of a first fixture used to position and test the magnetic head of FIG. 1 according to the present invention.
Figure 4:
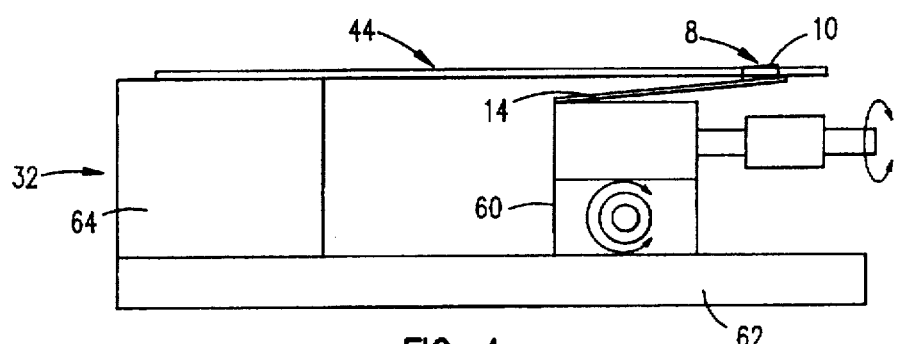
FIG. 4 is a schematic view of a second fixture used to position and test the magnetic head of FIG. 1 according to the present invention.

Prior to assembly, the slider 10 and the suspension 14 are mounted separately in a test fixture similar to test fixture 30 shown in FIG. 3 or test fixture 32 shown in FIG. 4. The slider 10 is preferably wired before mounting it in the test fixture 30 or 32 with the air bearing surface 15 facing towards the surface of the test disk. The wiring, routing, and sleeve crimping are completed before positioning the slider in the test fixture 30, 32. One or both of the transducers 26 may be wired with the wiring extending along either side of the suspension 14. When two transducers are wired, the wiring may be symmetrical in order to reduce the tilt induced into the flying attitude. The transducers 26 are then connected to test circuits (not shown). Once the slider 10 is wired, all subsequent assembly operations including testing and inspection are performed at the test fixture 30, 32.

The slider 10 is maintained in place by a cage or fence 44. The cage 44 may include air bearings for friction free centering. The test fixture 30, 32 automatically, or the operator manually, then tacks the suspension 14, the slider 10 or both, by applying adhesive tack adhesive 33 (FIG. 2), using techniques such as spot welding, soldering, or any other means that establishes a temporary bond which allows the repositioning of either the slider 10 or the suspension 14. The expression "tacks" is used to indicate that this bonding operation holds the bonded components in a temporary desired physical relationship during alignment and testing.

The suspension 14 is then loaded onto the surface 20 of the slider 10 by swinging or rotating the suspension 14 over the slider 10, and by temporarily positioning it close to the desired permanent bonded position. The slider 10 is optimally aligned relative to the suspension 14 at, or close to its optimal flying attitude, so that its center of gravity is over the geometric center of the dimple 12, or within a predetermined offset distance therefrom. The slider 10 is then pressed against the magnetic disk by the suspension 14.

The slider 10 is largely maintained in position by either the viscosity of the adhesive 33, the tack bond or by the cage 44. A small application of heat or ultraviolet light, depending on the specific type of adhesive used, may be lightly applied to tack the slider 10 in an initial, loose position, or to increase the tackiness to a usable level. The magnetic head 8 is tested by flying it over a magnetic medium 55 (FIG. 3), to determine if the initial flying attitude produces adequate performance. The gram load may require some adjustment at this or later stages in the process for proper overall flying height. If the dynamic performance were adequate, the adhesive 33 will be hardened to a firm tack by dismounting the magnetic head 8 and applying appropriate means for a final cure.

If the performance of the magnetic head 8 were not adequate, the slider 10 position relative to the suspension 14 is corrected by either moving the slider 10 relative to the suspension 14, using the test fixture 30, or alternatively by moving the suspension 14 relative to the slider 10, using the test fixture 32, until adequate dynamic performance, characterized by the output electrical signal is attained. The cage 44 may be used to "bump" the slider into position, backing off after each bump to permit free movement of the slider 10. Once adequate performance is reached, the slider 10 is firmly tacked into position, the magnetic head 8 is removed, and the adhesive 33 fully cured. Where flying height restrictions are particularly tight, the above alignment and testing process is repeated several times to determine the dependency of performance relative to the slider position. From such readings the test fixture 30, 32 (or the operator) can deduce the attitude of the slider 10 and adjust for minimum flying attitude.

The correction of the slider position relative to the suspension 14 is achieved by analyzing the electrical output signals from the slider 10, using a conventional dynamic electrical testing machine. When both sensors of a thin film head are wired, the analysis process id simplified. The optimal position of the slider 10 is then determined, for instance by calculation or by reference to a table, utilizing the electrical output signal analysis. Once the slider optimal position is determined, the repositioning of the slider 10 may be accomplished by a movable or robotic arm (not shown), while the slider 10 is still retained by the test fixture 30, 32. Alternatively, the repositioning of the slider 10 may be accomplished by removing the magnetic head 8 from the test structure 30, 32, breaking the bonding tacks 33, retacking the slider 10 in the proper location for optimal flying and magnetic performance, and then repositioning the magnetic head 8 in the test fixtures 30, 32.

FIGS. 3 and 4 illustrate two alternative embodiments of the test fixtures used in positioning and testing the magnetic head 8. The test fixture 30 of FIG. 3 retains the suspension 14 in a fixed position and allows the slider 10 to move within parameters set by the cage 44. The test fixture 32 of FIG. 4 retains the slider 10 in a fixed position and allows the suspension 14 to move within parameters set by the cage 44.

Figure 5:
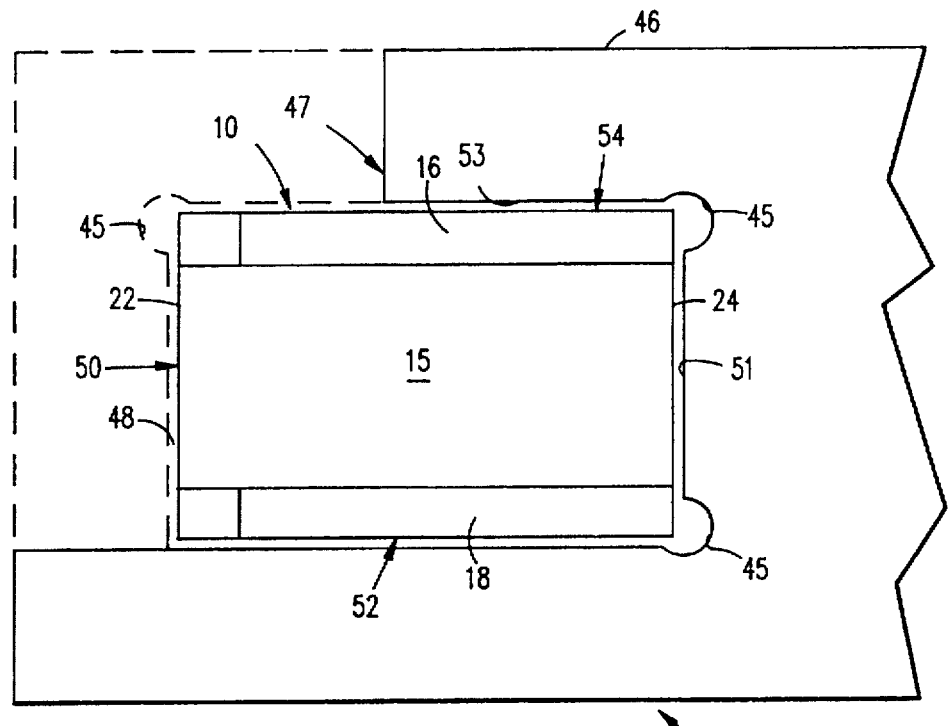
FIG. 5 is an enlarged top plan view of the slider shown mounted in either the test fixture of FIG. 3 or FIG. 4.

With reference to FIGS. 3, 4 and 5, the cage 44 includes a flat, thin elongated arm 46 which extends at its forward end into a notched section 47 that surrounds at least three of the four sides 50, 51, 52 and 54 of the slider 10. The cage 44 is generally thinner than the slider 10 and is made of rigid material such as steel. For instance, if the slider 10 were 17 mils (milli-inches) thick, the cage 44 may be approximately 10 mils thick. The cage 44 remains parallel to the plane of the magnetic disk 55. As the disk 55 rotates at a normal operating drive speed, it generates a drag on the slider 10, forcing it against the wall 50 of the notched section 47. The speed of the disk 55 may be changed so that the difference in electrical performance provides an indication of the overall head magnetic performance.

If the bond of the tack adhesive 33 is light, the slider 10 will move against the wall 54, causing the tack adhesive 33 to break, in which event, the cage 44 will hold the slider 10 in a fixed position. The preferred cage design for light tack adhesive is illustrated in FIG. 5, which includes an open C-design used when the positioning of the slider 10 depends on the motion of the cage 44 to push it into position. This design is referred to as the "floating technique", and it allows for some friction tolerance between the slider 10 and the suspension 14. One or more relief openings 45 are formed in the notched section 47 and minimal clearance 53 may be left between the slider 10 and the wall 54 of the notched section 47 to provide better positioning control of the slider 10 within the notched section 47.

In the case where the tack adhesive 33 is not hardened, and the slider 10 is not positioned by means of the cage 44 during flying, then the notched section 47 of the cage 44 is made to completely surround the four sides of the slider 10 (as illustrated by the dashed lines). Once the tack adhesive 33 is broken, the slider 10 may be replaced within a closed notch 48 formed within the notched section 47, and allowed to move freely without bonding. Alternatively, the slider 10 is moved to a new position relative to the suspension 14 by means of the cage 44, and then tacked into position. The cage 44 is then moved away from the slider 10 to eliminate contact between the cage 44 and the slider 10, in order to allow the slider 10 to reach its fully flying state without any friction effect from the cage 44. This testing process may be repeated as many times as needed.

The test fixture 30 of FIG. 3 includes an X-Y positioner 60 that supports and retains the rearward end of the cage 44.

The positioner 60 may be moved on a fixed base plate 62 in two directions X and Y, in order to correct for pitch and roll. The X-Y positioner 60 is locked in position when the final alignment is completed. The test fixture 30 also includes a stationary mounting block 64 that supports the suspension 14. The test fixture 32 of FIG. 4 includes the same components as the test fixture 30, except that the stationary mounting block 64 supports the cage 44, while the X-Y positioner 60 supports the suspension 14.

The testing of the magnetic head 8 is initiated by rotating the magnetic disk 55, and by causing the magnetic head 8 to write data tracks onto the disk 55. The data is then read back and the resultant amplitude determined. If one of the transducers 26 were inoperative or otherwise well below the set specifications, the test fixture 30, 32 will clip the wires to that defective transducer 26. Where both transducers 26 are active, roll is easily measured by comparison of the amplitudes. Pitch is inferred by prodding the slider 10 with the cage to various locations and analyzing the resultant graphs. Once the best pitch and roll setting is obtained, the slider adhesive is exposed to either heat or UV for hard tacking into position. In one phase, the magnetic disk 55 is rotated at a substantially constant speed. In another phase, the magnetic disk 55 is rotated at different speeds.

In cases where both transducers are active, the test fixture 30, 32 will designate whether the magnetic head 8 is an UP or DOWN head. UP or DOWN designation is established by the test fixture 30, 32 cutting the wires to the unused transducer 26. If the transducers 26 perform significantly differently, the best performing transducer 26 will be selected. The ability to measure PW50 is an additional consideration in determining head performance. PW50 is the width of an isolated pulse from its peak amplitude to its 50% peak amplitude measured in seconds. This parameter is particularly sensitive to flying height. The test fixture 30, 32 tracks the quantity of each transducer type it produces, and strives to keep an even balance between the UP and DOWN heads. If none of the transducers 26 performs adequately, the test fixture 30, 32 will not hard tack the slider 10 or cut wires. Then either the slider 10, the suspension, or both can be reused without significant salvage labor or damage. The test fixture 30, 32 automatically prevents the assembly of heads beyond acceptable process limits.

The overall flying height of the magnetic head 8 is estimated from the peak amplitude and/or signal strength curves. The test fixture 30, 32 will accordingly set the head gram loads. The head gram loads may be different for UP and DOWN heads. Often the suspension 14 starts with a nominally higher gram load than the target gram load, in order to account for thermal adjustment by heat induced relaxation. Mechanical reforming methods allow initial settings to be close to nominal. With thermal techniques, the magnetic head 8 requires lowering the gram load which will be done automatically while it is supported by the test fixture 30, 32. For this purpose, a carbon dioxide laser and a beam director (not shown) are preferably used. The laser will minimize setting times and the heat that is introduced within the test fixture 30, 32, which could adversely affect the adhesive bonding process and system accuracy.

By virtue of the process disclosed herein, significant improvement in flying height control, performance, and yield of the magnetic head are realized, by defining an optimal bonding point for the slider relative to the head suspension.

It should be understood that the geometry, dimensions and parameters described above may be modified within the scope of the invention.

What is claimed is:

1. A method for assembling and electrically testing a magnetic head comprising the steps of:

wiring an air bearing slider;

loading a head suspension into a test fixture including a cage;

positioning the wired slider in said cage;

establishing a temporary bond between said slider and said suspension;

temporarily positioning said slider relative to said suspension;

spinning a magnetic medium at a flying attitude relative to said slider while bonded and positioned relative to said suspension;

measuring said flying attitude for determining dynamic performance of said air bearing slider; and then adjusting said slider position relative to said suspension for optimizing the dynamic performance of said air bearing slider.

2. The method according to claim 1, permanently bonding said slider to said suspension after said measuring and adjusting steps.

3. The method according to claim 1, including the step of pressing said slider against the magnetic medium before the magnetic medium is spun.

4. The method according to claim 1, wherein said step of spinning the magnetic medium includes spinning at a substantially constant operating speed.

5. The method according to claim 1, wherein said step of spinning the magnetic medium includes spinning at different speeds.

6. The method according to claim 1, wherein said step of adjusting includes the step of moving said slider relative to said suspension.

7. The method according to claim 1, wherein said step of adjusting includes the step of moving said suspension relative to said slider.

8. The method according to claim 1, wherein said step of measuring includes the step of analyzing electrical output signals generated by said slider.

9. The method according to claim 1, wherein said step of adjusting said slider position includes the step of determining an optimal position of said slider relative to said suspension.

10. The method according to claim 9, wherein said step of measuring includes the steps of recording data onto said magnetic medium; and reading back the recorded data.

11. The method according to claim 10, wherein said step of wiring said slider includes wiring a plurality of transducers.

12. The method according to claim 11, including the step of disconnecting the wires to said transducers excepting for one selected operative transducer.

* * * * *